(12) United States Patent
Ames et al.

(10) Patent No.: US 10,227,749 B2
(45) Date of Patent: Mar. 12, 2019

(54) LANDFILL LINER SYSTEM

(71) Applicants: Trevor B. Ames, Whitefish, MT (US); Bryan S. Embry, Joelton, TN (US)

(72) Inventors: Trevor B. Ames, Whitefish, MT (US); Bryan S. Embry, Joelton, TN (US)

(73) Assignee: R&B LEASING, Grand Junction, CO (US)

( * ) Notice: Subject to any disclaimer, the term of this patent is extended or adjusted under 35 U.S.C. 154(b) by 0 days.

(21) Appl. No.: 15/581,985

(22) Filed: Apr. 28, 2017

(65) Prior Publication Data
US 2018/0313055 A1    Nov. 1, 2018

(51) Int. Cl.
*E02D 31/00* (2006.01)
*B09B 1/00* (2006.01)
*E02D 5/76* (2006.01)

(52) U.S. Cl.
CPC .............. *E02D 31/004* (2013.01); *B09B 1/00* (2013.01); *E02D 5/76* (2013.01); *E02D 2300/002* (2013.01); *E02D 2300/0029* (2013.01); *E02D 2300/0087* (2013.01); *E02D 2600/30* (2013.01)

(58) Field of Classification Search
CPC .......... E02D 5/76; E02D 31/004; B09B 1/004
USPC ........ 405/129.6, 129.7, 129.75, 129.85, 262, 405/284, 286, 287, 287.1, 302.4, 302.6, 405/302.7
See application file for complete search history.

(56) References Cited

U.S. PATENT DOCUMENTS

| | | | | | |
|---|---|---|---|---|---|
| 4,952,097 | A | * | 8/1990 | Kulchin | E02D 5/76 405/262 |
| 5,570,974 | A | * | 11/1996 | Jax | B09B 1/00 405/129.5 |
| 5,588,784 | A | * | 12/1996 | Brandl | E02D 5/74 405/262 |
| 6,524,027 | B1 | * | 2/2003 | Fabius | E01B 2/006 405/16 |

(Continued)

OTHER PUBLICATIONS

Flexible Waterproofing of Tunnels with Sikaplan® Membranes, http://www.sikawaterproofing.co.uk/wp-content/uploads/2014/09/bro_flexible-waterproofing-of-tunnels-with-sikaplan-membranes.pdf, accessed online on Mar. 6, 2018, pp. 1-21, Sika 1910.

(Continued)

*Primary Examiner* — Carib A Oquendo
(74) *Attorney, Agent, or Firm* — Berg Hill Greenleaf Ruscitti LLP

(57) ABSTRACT

A system and method are provided for a protective barrier liner system on near vertical to vertical slopes of a waste facility. The system includes anchors installed into the side walls of the waste facility, a drainage network including geo-composite drain strips, steel reinforcement, a sprayed water proof membrane, and a pneumatically applied final protective concrete cap layer. The anchors may include soil nails launched from a pneumatic launching device or anchors placed in drilled bores then reinforced with grout. The water proof membrane may be installed between an initial layer of concrete and the final layer of concrete to protect the membrane from damage by facility operations. The steel reinforcement may include wire mesh, whalers, bearing plates, shear studs secured to the bearing plates, and combinations thereof. The system can be constructed in progressive bands spliced together enabling construction of the complete system over a longer period of time.

6 Claims, 9 Drawing Sheets

(56) References Cited

U.S. PATENT DOCUMENTS

| | | | | |
|---|---|---|---|---|
| 6,565,288 | B1* | 5/2003 | McCallion | E02D 5/74 405/259.5 |
| 6,719,498 | B2* | 4/2004 | Barley | E02D 5/74 405/259.1 |
| 2003/0037499 | A1* | 2/2003 | Coulton | E04L 31/7046 52/302.3 |
| 2004/0052587 | A1* | 3/2004 | Kulchin | E02D 5/76 405/262 |
| 2004/0109729 | A1* | 6/2004 | Hilfiker | B21C 37/20 405/262 |
| 2006/0153646 | A1* | 7/2006 | Cammack | E02D 29/0233 405/285 |
| 2007/0092343 | A1* | 4/2007 | Cargill | E02D 29/0233 405/284 |
| 2012/0198787 | A1* | 8/2012 | Mo | E04B 1/66 52/741.4 |
| 2014/0314494 | A1* | 10/2014 | Wang | E02D 17/04 405/229 |

OTHER PUBLICATIONS

United States Environmental Protection Agency, Geosynthetic Clay Liners Used in Municipal Solid Waste Landfills, Revised Dec. 2001, https://www.epa.gov/sites/production/files/2016-03/documents/geosyn.pdf, accessed online on Mar. 6, 2018, pp. 1-8.

Bekta, et al., Guidance for the Use of Geosynthetic Clay Liners (GCLs) at Solid Waste Facilities, Revised and Updated May 2000, http://dnr.wi.gov/files/PDF/pubs/wa/WA823.pdf, accessed online on Mar. 6, 2018, pp. 2-39, Bureau of Waste Management Wisconsin Department of Natural Resources.

Waste Management, Modern Landfill Design, http://millseatlandfill.wm.com/environmental-protection/modern-landfill-design.jsp, accessed online on Mar. 7, 2018, p. 1.

Granger, Landfill Cross Section, https://www.grangernet.com/wp-content/uploads/2016/02/cross_section_doublecompositeliner_12.pdf, accessed online on Mar. 7, 2018, p. 1, Granger III and Associates, LLC.

Typical Landfill Cell Design, https://www.researchgate.net/figure/Typical-Landfill-Cell-Design-UNEP-2005_fig14_303723673, accessed online on Mar. 7, 2018, Figure 2.17.

* cited by examiner

LANDFILL LINER SYSTEM

FIELD OF THE INVENTION

The invention relates to barriers constructed to isolate potentially hazardous materials found in waste facilities such as landfills and coal ash ponds, and more particularly to a barrier liner system and method of constructing the system that can be installed on vertical slopes.

BACKGROUND

Specific designs for landfill liner systems will vary depending on the specific local geology and state and local regulatory requirements. However, common elements in such systems, from the lowermost elements upward, may include (1) a lower compacted clay liner that lies above undisturbed in situ soils, (2) one or more lower high-density polyethylene (HPDE) liners, (3) one or more lower drainage layers, (4) one or more intermediate HPDE liners, (5) intermediate cushion and drainage layers, (6) compacted waste lifts with daily cover soil between lifts (7) an upper cushion layer (8) an HPDE cap liner (9) an upper drainage layer (10) a soil barrier layer (11) topsoil, and (12) vegetative cover.

In addition to these layered elements, the landfill will include a leachate collection system including a network of leachate collection pipes, a leachate sump, one or more leachate pumps, and a leachate collection container/reservoir. Groundwater monitoring wells are installed to monitor the presence of contaminants around the landfill site that may seep into the underlying groundwater zone if there is a failure or breach of system.

Gas monitoring probes are also installed to monitor the presence of gases produced from waste decomposition such as methane. Landfill gas collection is also a requirement and landfill gas collection is typically achieved through use of gas wells installed in the waste mass. Gas header manifolds communicate with the wells to capture and transport the waste gas for treatment or disposal, such as at a local flare plant or a landfill gas to energy (LFGTE) plant.

As one should appreciate from the foregoing, there are extensive design requirements for municipal solid waste facilities. There are many regulatory design requirements and corresponding literature that describes existing landfill designs since these designs are subject to considerable local, state, and federal regulations.

Although landfill design includes a many technological solutions, one noteworthy deficiency in landfill design is the inability to reliably and economically provide a liner system for municipal waste facilities that have near vertical or vertical walls.

Environmental regulations in the United States and many other countries require liners for solid waste facilities to have specified hydraulic properties to withstand forces produced on the liners as operation of a facility progresses over time. One category of landfills in the U.S. is referred to as "subtitle D" landfills. These landfills, by regulation, are required to incorporate a 2-ft thick compacted clay liner (CCL) that has a permeability less than or equal to $1.0 \times 10^{-7}$ cm/s. In a more extreme case, landfills operated in converted rock quarries are required to install a 10-foot thick CCL along the side walls of the facility. If the facility does not have the liner material, it must be imported. The requirement to import liner material is very costly to the landfill operation. The equipment and manpower necessary to install a CCL is significant; thus adding additional cost to the landfill operation. Use of a 10-foot thick liner also reduces the available volume of the facility to hold waste thus reducing revenue for the facility by limiting its capacity.

There are alternative liners used in waste containment facilities to reduce the constraints of a CCL. For example, a commonly used alternate liner is a geo-synthetic clay liner (GCL) which is a much thinner woven geo-synthetic material with an imbedded barrier layer (e.g. bentonite). The imbedded layer expands or swells when exposed to moisture, and this expansion provides the non-permeable barrier required for some landfill designs.

While GCL is an alternative barrier liner solution, GCL also has clear shortcomings. GCL is susceptible to damage by equipment used to operate the facility because it can be punctured and torn. GCL may have sufficient shear strength to prevent tearing when installed on an undisturbed horizontal surface, but heavy equipment can damage the GCL and it can be difficult to determine when damage occurs because of soil and rock that may partially cover the GCL as it is installed. Another disadvantage of GCL is that it cannot be installed on near vertical slopes. Solid waste in a landfill facility will experience significant settlement as the waste decomposes. The waste adheres to the GCL and can subsequently puncture or tear the GCL. If the imbedded barrier layer in the GCL is installed on a near vertical surface, the GCL may also settle resulting in the upper portion of a sheet of GCL being thinner than the lower portion. Subsequently the thinned upper portion may not have the required barrier thickness.

Other methods of lining vertical walls of a landfill include the use of precast concrete structures built along the side walls of the facility. Intact concrete is essentially an impermeable material. However concrete can develop cracks for a multitude of reasons rendering use of concrete by itself a non-viable alternative liner system. If the concrete is exposed to moisture, freeze-thaw cycles can cause cracking even in the highest quality concrete. Precast concrete panels are expensive not only for the material costs, but also transportation costs since most landfills do not have a precast concrete manufacturing facility.

Another method for lining vertical walls of a landfill includes the use of rubber membranes that may prevent potentially harmful liquids (leachate) from entering cracks in an underlying barrier material. However, as mentioned, solid waste will experience settlement as the waste decomposes. The waste can adhere to the rubber liner and as the waste settles. Down drag forces caused by the shifting waste can also create tears in a rubber membrane thereby compromising the integrity of the landfill facility.

Considering the shortcomings of the prior art, there is a need to provide a barrier liner design that can handle drag down forces created by waste decomposition. There is also a need to provide a barrier liner design that can better withstand damage produced by heavy equipment or other external forces. There is yet further a need to provide a barrier liner design that is cost effective and complies with regulatory requirements.

SUMMARY OF THE INVENTION

In accordance with the invention, a system and method are provided for installing a functionally equivalent landfill liner system as an alternative to a compacted clay liner (CCL) specified for waste containment facilities. A first step in the method for installing the liner system includes installing anchors into the rock and soil of the slope over which the liner system is installed. The anchors provide stabilization for the slope and provide a structural connection for a concrete facing treatment. One type of anchor that may be used includes soil nails that are embedded in the slope surface by a pneumatic launching device. The anchors may also be installed into the slope by drilling holes in the slope and then inserting the anchors in the bore holes and securing them by cementious material injected in the bore holes. The heads of the anchors remain exposed and protrude from the sloping face so that the heads can be structural connectors for the overlying liner system.

After installation of the anchors, a drain network is secured to the slope to prevent hydrostatic buildup of groundwater on the earth facing side of the waste facility. The drain network may include a group of geo-composite drain strips secured to the slope and designed to accommodate the anticipated amount of groundwater flow. The drain strips are connected to a pipe system that routes captured groundwater to a collection point removing the groundwater from the area around the waste facility. The captured groundwater can be collected and sampled for the presence of leachate. This testing enables long-term evaluation of the performance of the barrier liner system. If leachate is found in the collected groundwater, then it is presumed that the liner system is compromised.

Following installation of the drainage system, an initial layer of pneumatically applied concrete may be applied against the sloping surface to provide a relatively smooth and even surface as a base for the next applied layer, namely, a sprayed waterproof membrane. The initial layer of concrete is only applied as thick as necessary to achieve a relatively even surface, and this layer of concrete is not intended to be a structural supporting layer. The pneumatically applied concrete can be delivered by a wet method such as shotcrete or a dry method such as gunite. The concrete composition may comprise, but is not limited to, Type I or Type II cement, fly ash, fine and coarse aggregates, and polypropylene fibers. The composition may be air-entrained. Admixtures can be selectively added to the concrete mix as needed for environmental conditions such as extreme cold and hot weather conditions. Examples of admixtures may include water reducers, accelerants, hydration stabilizers, coagulants and combinations thereof.

The spray-on waterproof membrane is applied evenly across the initial concrete layer, and special attention is given to applying the membrane around the protruding anchor heads to ensure a complete watertight seal around each of the anchor heads. If the anchor heads have threaded ends, the anchor heads can be temporarily covered to prevent the spray-on membrane from filling the threads. One example of a spray-on membrane may include TamSeal 800 or equivalent.

Steel reinforcement is installed on the slope to provide structural strength to the liner system. The steel reinforcement also provides a mitigation solution to protect personnel from rock fall hazards. The reinforcement may include welded wire mesh, rebar, high tension mesh, and combinations thereof. Exposure to leachate, while unlikely, is still possible through cracks or tears in the spray-on membrane. Leachate is corrosive so the steel reinforcement should preferably be epoxy coated or galvanized steel.

One advantageous application for the vertical liner system of the invention is municipal solid waste (MSW) landfills operated in expired rock quarries. A common hazard in these rock quarries is degrading rock slopes that can trigger rock falls from high walls. Another application for the vertical liner system of the invention is a MSW operated in a depleted mine that also has inherent rock fall hazards. These quarries and mines may already have a rock fall hazard mitigation system in place that is typically a pinned or draped mesh system. This mesh may be galvanized and have a high tensile capacity. In this situation, the preinstalled mesh system can be used for the steel reinforcement layer or an additional steel reinforcement layer of the system. The concrete may be applied directly against the preinstalled mesh system. Anchors however are still required and are installed prior to application of the concrete against the preinstalled mesh system.

The liner system of the invention may be installed in horizontal bands or increments as the waste level rises in the MWF, as discussed in further detail. In the case of a preinstalled mesh system, it serves a dual purpose; a structural support layer and rock fall mitigation for areas above the presently installed liner system band(s).

Additional structural support as mentioned can include a combination of welded wire mesh, rebar, or high tension mesh. If rebar is used in combination with a wire mesh, rebar may also be collectively referred to as whalers. Both vertical and horizontal whalers may be installed.

Further structural support is provided by bearing plates that are installed over selected anchor heads. For example, the bearing plates may have a central opening to receive the anchor heads in which the bearing plates are secured to the anchor heads by a beveled washer and nut combination.

Yet additional steel reinforcement may include a plurality of shear studs welded to the bearing plates, rebar, wire mesh, and combinations thereof.

After sufficient structural support is installed, a final protective layer of concrete is applied. The concrete cap can be pneumatically applied like the first or initial concrete layer. The composition of the final layer of concrete or concrete cap can be made of the same constituents and proportions as the initial layer of concrete.

In another embodiment of the invention, an additional or second mesh reinforcement layer can be added to provide yet further metallic support for the liner system. The second mesh reinforcement layer can be arranged over the bearing plates and spaced from the first mesh reinforcement layer. To providing anchoring support for the second mesh layer, a plurality of shear studs may be welded to the bearing plates and the studs extend from the plates so that the second mesh layer may be tied or otherwise secured to the studs.

The liner system of the invention is constructed in overlapping horizontal bands of any height as desired by the landfill operator. A selected progressive construction of the landfill liner allows the landfill operator to spread out the cost of the liner system over time. Accordingly, revenue generated by the facility as time progresses can be used to pay for the liner system throughout the life of the facility.

Each horizontal band is constructed to allow a subsequent band to be tied to the existing band. In order to splice or attach the bands together, the geo-composite drain strips, spray-on membrane, and structural steel reinforcement must extend above the existing height of concrete to allow connection to the next band to be constructed. The exposed upper ends of the splicing elements can be protected from the operations of the facility and rock falls by covering them with a temporary barrier such as rubber matting.

As for the actual splicing required between bands, the facing upper and lower ends of the wire mesh sections to be spliced may simply have wires tied together by twisting the wires. For the drain strips, splicing a connection between bands can be achieved by conventional connectors. The next waterproof membrane to be added in the next band is sprayed on such that the newly applied waterproof membrane overlaps the existing waterproof membrane.

The constructed liner system of the invention is designed to withstand the normal force of compacted waste to prevent flexure of the face of the liner system and resulting cracks. However in the event that cracks occur, the embedded membrane prevents groundwater from entering the deposited waste and also prevents leachate from entering the exterior groundwater. The installed membrane is capable of withstanding the stress and strain experienced during landfill operations which can be in the form of bending or flexure of the membrane. Additionally, the final protective layer of concrete prevents down drag forces generated from waste decomposition from being transferred to the membrane.

In lieu of a spray-on membrane, the system and method of the invention may include the use of a pre-fabricated membrane that is positioned on the surfaces of the walls. One example of commercially available pre-fabricated membranes includes Sikaplan® membranes. Pre-fabricated membranes are provided in sheets that can be sized to fit the area to be waterproofed. Seams or edges between adjacent sheets of the waterproof membrane may be sealed to one another by heat welding. Material costs for this alternate liner solution are minimized because the amount of liner material required is only enough necessary to line the next lift or band of the liner system.

As mentioned, one type of material that can be used for the waterproof membrane of the invention includes a polyurethane resin. Other thermoplastic resins that may be used include PVC, polyethylene, polystyrene, and polypropylene.

Considering the foregoing features and advantages of the system, in one aspect, it can be considered a landfill or waste liner system especially adapted for installation on near vertical or vertical walls of a waste facility, said liner system comprising: a plurality of anchors imbedded in a wall of the waste facility, and said anchors having exposed ends that protrude from the wall; a drainage network secured against the wall, said network comprising a plurality of drain elements that capture water and channel the water away from the liner system; a water proof membrane applied to the wall to function as a waterproof layer to prevent liquid from escaping the liner system; metallic reinforcement including; (i) a mesh reinforcement layer placed adjacent the water proof membrane and supported by said anchors; (ii) a plurality of whalers connected to the mesh reinforcement layer; and (iii) a plurality of hardware elements secured to corresponding exposed ends of said anchors; and a layer of concrete applied to function as a protective cap layer for the liner system, the applied concrete being selectively applied to provide a structural connection for the anchors, drainage network, water proof membrane and metallic reinforcement.

In another aspect of the invention, it may be considered a method of installing a liner system especially adapted for a near vertical or vertical walls of a waste facility, said method comprising: installing a plurality of anchors in a wall of the waste facility, each anchor having an exposed end that protrude from the wall; installing a drainage network against the wall, said network comprising a plurality of drain elements that capture water and channel the water away from the liner system; spraying a water proof membrane onto the wall to function as a waterproof layer to prevent liquid from escaping the liner system; securing metallic reinforcement against the wall and in contact with the water proof membrane, the reinforcement including (i) a mesh reinforcement layer placed adjacent the water proof membrane and supported by said anchors; (ii) a plurality of whalers connected to the mesh reinforcement layer; and (iii) a plurality of hardware elements secured to corresponding exposed ends of said anchors; and applying a layer of concrete to function as a protective cap layer for the liner system, the applied concrete providing a structural connection for the anchors, drainage network, water proof membrane and metallic reinforcement.

In yet another aspect of the invention it may be considered a liner system especially adapted for installation on near vertical or vertical walls of a waste facility, said liner system comprising: (1) a first liner assembly band including: a first plurality of anchors imbedded in a wall of the waste facility, each anchor having an exposed end that protrudes from the wall; a first plurality of drain elements that capture water and channel the water away from the liner system; a first water proof membrane applied to the wall to function as a waterproof layer to prevent liquid from escaping the liner system; a first metallic reinforcement including a first mesh reinforcement layer placed adjacent the first water proof membrane and supported by said first anchors and a first plurality of whalers connected to the first mesh reinforcement layer; and a first layer of concrete applied to function as a protective cap layer for the first liner assembly band; the applied first layer of concrete providing a structural connection for the first anchors, first drain elements, first water proof membrane and first metallic reinforcement, wherein the first liner assembly has an upper end defined by an upper edge of said layer of concrete, said waterproof membrane and said metallic reinforcement extending above said upper end as splicing elements for attachment to a subsequent liner assembly disposed above said first liner assembly; and (2) a second liner assembly band disposed above said first liner assembly band including: a second plurality of anchors imbedded in the wall of the waste facility, each anchor having an exposed end that protrudes from the wall; a second plurality of drain elements that capture water and channel the water away from the liner system; a second water proof membrane applied to the wall to function as a waterproof layer to prevent liquid from escaping the liner system; a second metallic reinforcement including a second mesh reinforcement layer placed adjacent the second water proof membrane and supported by said second anchors, and a second plurality of whalers connected to the second mesh reinforcement layer; and a second layer of concrete applied to function as a protective cap layer for the second liner assembly band; the applied second layer of concrete providing a structural connection for the second anchors, second drain elements, second water proof membrane and second metallic reinforcement.

DETAILED DESCRIPTION

Figure 1:
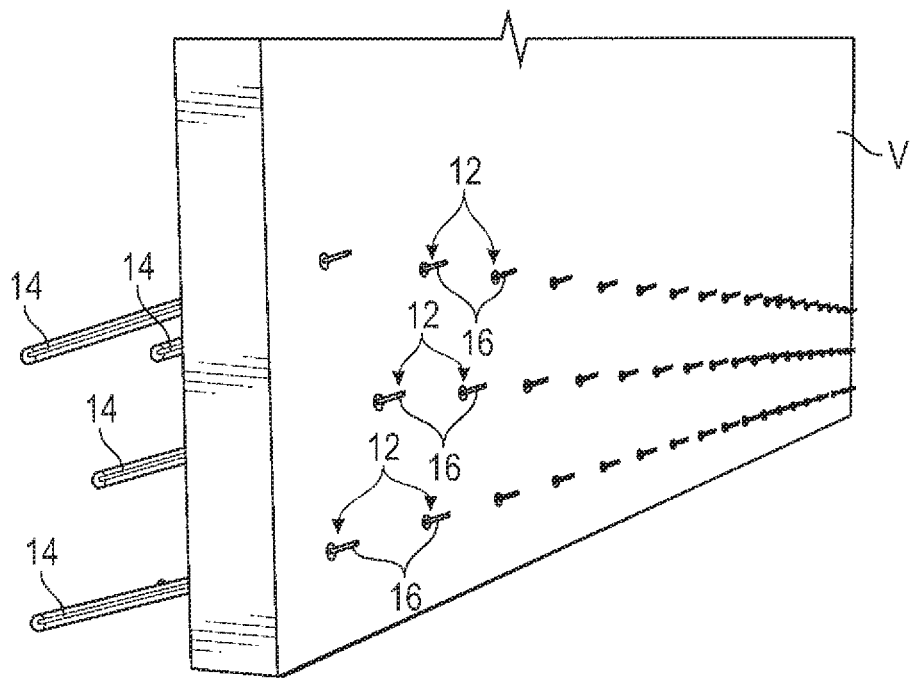
FIG. 1 is a schematic perspective representation of a vertical sidewall of a waste facility with a plurality of anchors imbedded in the sidewall.
Figure 2:
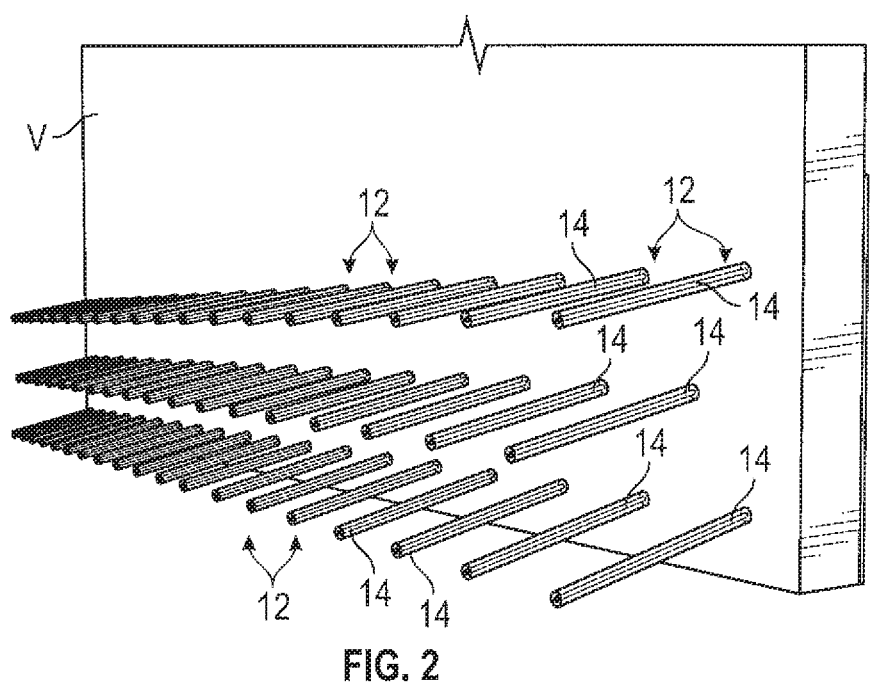
FIG. 2 is another schematic representation of the vertical sidewall of FIG. 1 showing a reverse or rear side view.

FIGS. 1 and 2 show a vertical or near vertical wall V that is found in a MWF located in a quarry, mine, or other excavation. The wall V is schematically illustrated as being vertical and smooth; however, it is understood that a vertical wall in an excavation will have irregularities including protruding rocks or other geologic formations. The back or rear side of the wall V in FIG. 2 is shown as open or exposed for purposes of better viewing the way in which a plurality of anchors 12 are disposed within corresponding boreholes 14.

The boreholes 14 are schematically shown as extending beyond the wall V, and this schematic representation is provided to simply illustrate that the anchors 12 are placed within the borehole of a larger diameter and preferably centered in the borehole 14. The boreholes are therefore drilled to the larger diameter and selected in size to accommodate the necessary cementious material in the boreholes to achieve the designed pull-out capacity. The anchors 12 may be installed by a pneumatic launching device in which no boreholes are required; rather, the anchors are launched nails sufficiently imbedded in the wall by soil and rock that collapses around the nails after launching. For each of the drawings, the anchors 12 may therefore represent anchors in drilled boreholes, launched soil nails, or combinations thereof.

FIGS. 1 and 2 are intended to represent a vertical or near vertical wall V in a first step for making the liner system of the invention in which the anchors 12 are installed. The anchors 12 are shown as being arranged in a plurality of horizontal rows and uniformly spaced from one another. It shall be appreciated however that the anchors 12 can be arranged in a desired geometric pattern or a non-uniform or irregular pattern depending on the surrounding geology.

The anchors 12 are also illustrated as being installed at a consistent angle with respect to the wall V; however, it is also contemplated that the anchors can be installed at different angles, again depending upon the characteristics of the surrounding geological formation.

The anchors 12 can be more specifically: (1) soil nails that can be pneumatically launched from a soil nail launcher; (2) the anchors 12 can be installed in boreholes 14 that are drilled in the wall V or (3) combinations of launched nails or drilled anchors. One advantage of launched nails is that they do not require a borehole with grouting since the surrounding rock/soil collapses around the nail. Therefore, it should be understood that the boreholes 14 are not required for launched nails. If drilled anchors are installed, cementious grout may be injected in the boreholes 14 to provide additional pullout capacity for the anchors 12.

As also illustrated, ends 16 of the anchors 12 remain exposed and extend away from the wall V. These protruding ends 16 are also used as supporting structure to secure various layers or elements of the liner system as described below.

Figure 3:
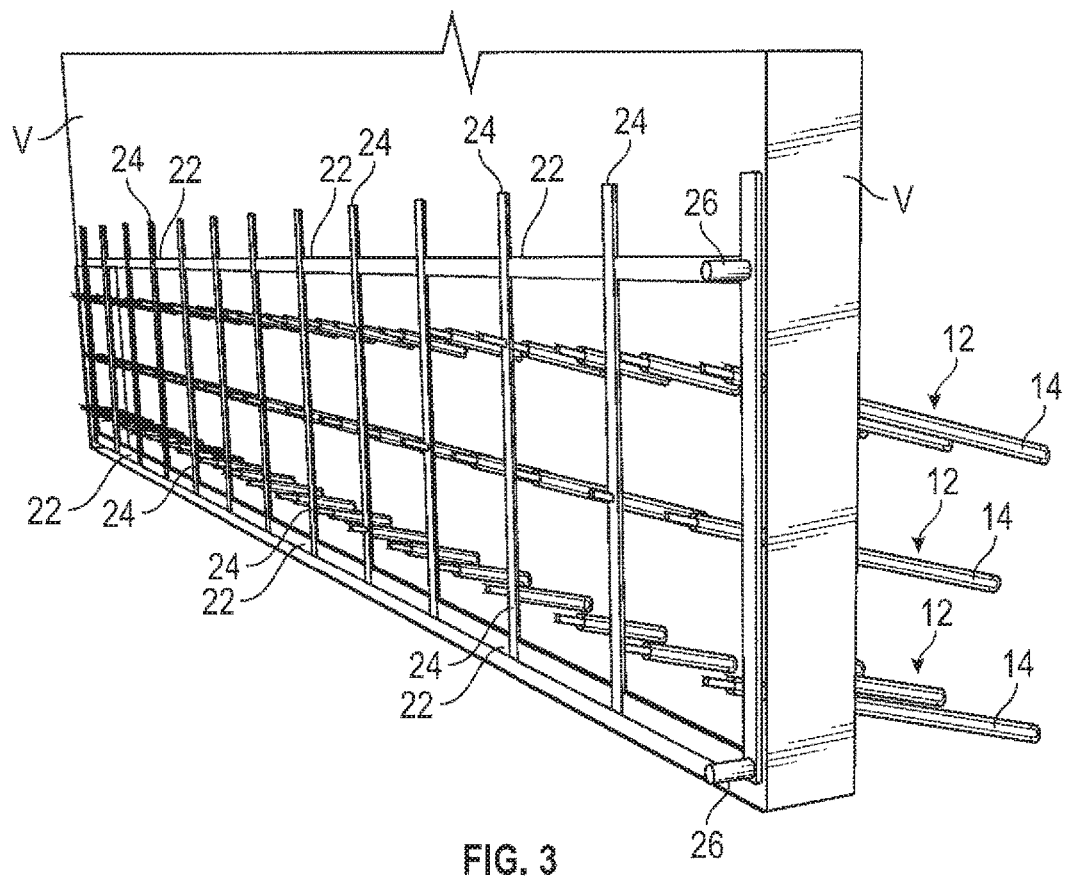
FIG. 3 is another schematic showing a subsequent step in a method of installing the liner system, namely, installation of a drainage network.
Figure 4:
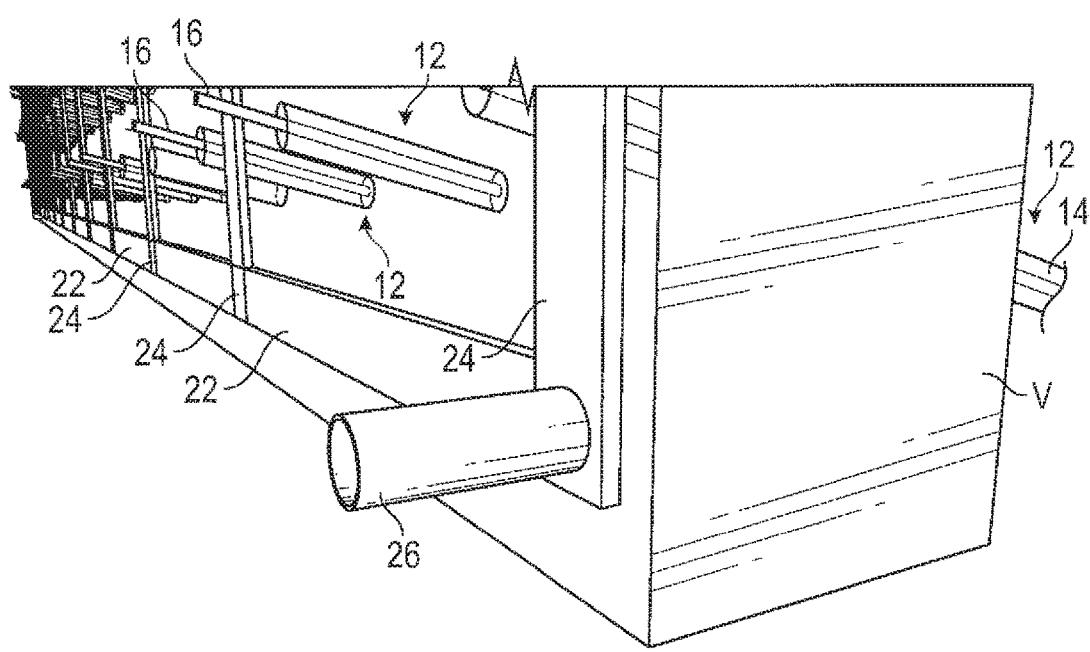
FIG. 4 is a greatly enlarged schematic of a portion of FIG. 3.

Referring to FIGS. 3 and 4, a next step in the installation of the liner system includes emplacing a drainage network including a plurality of drain elements such as geo-composite strips. These figures show both horizontal 22 and vertical 24 geo-composite strips but it should be understood that these drain elements may cover the surface of the vertical wall V in any desired orientation to manage drainage. These drain strips 22 and 24 communicate with one or more drain pipes 26 that carry collected water away from the liner system. Two drain pipes are shown; one upper and one lower. For the upper drain pipe 26, this can be used to drain collected water from geo-composite strips located above the drain (not shown) in the next band of the liner system to be constructed.

A next optional step in the installation of the liner system is the application of a thin concrete layer (not shown) that provides a relatively smooth surface for the next layer, namely, the spray-on membrane. This interior concrete layer is not intended to be a structural support and rather is provided as a pretreatment for the spray-on membrane so that the membrane material can be more easily applied in a uniform thickness.

Figure 5:
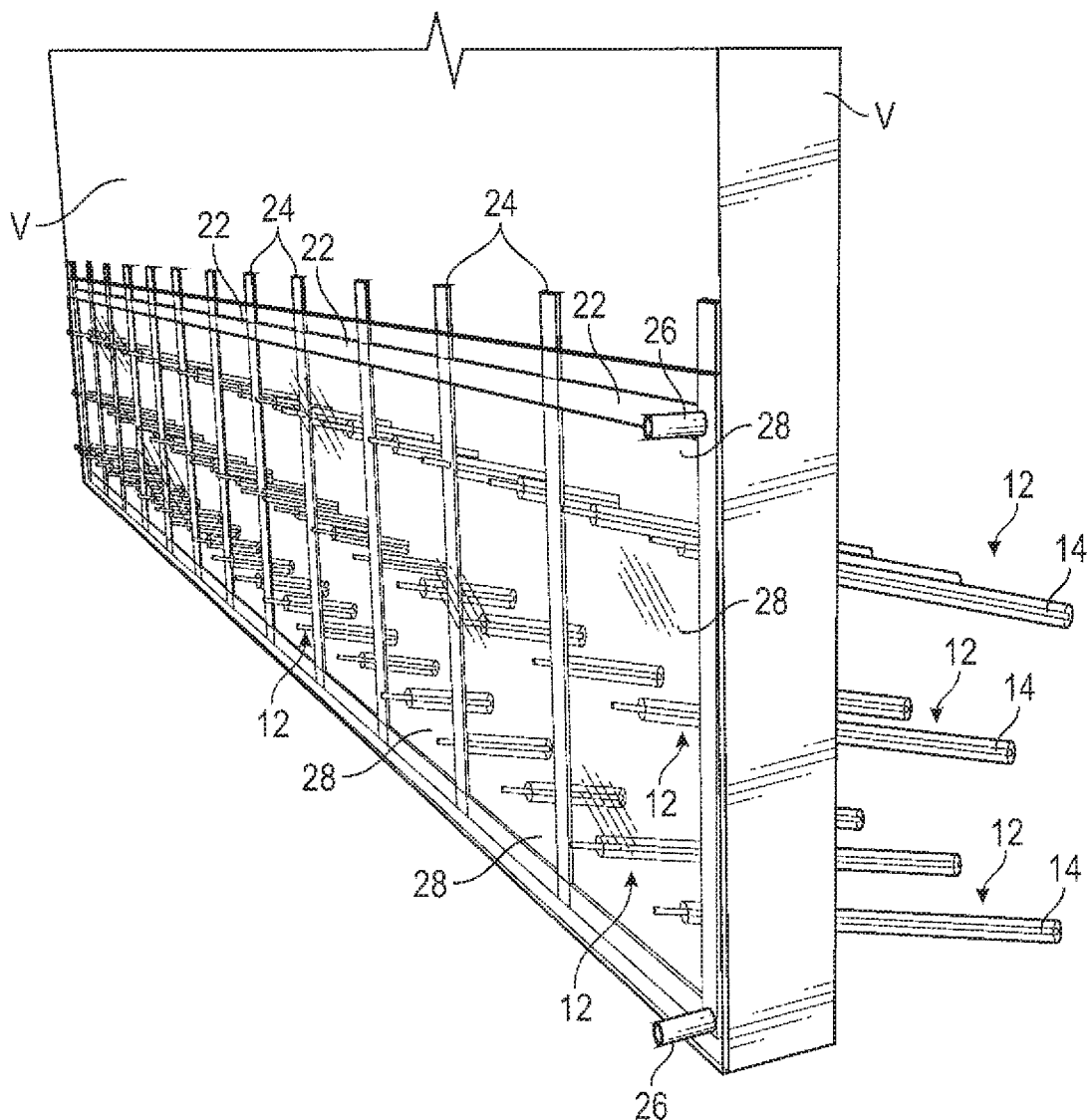
FIG. 5 is another schematic showing a subsequent step in the method of installing the liner system, namely, installation of a spray-on water proof membrane.

Referring to FIG. 5, this figure represents a next step in the installation of liner system in which a membrane 28, such as the spray-on membrane, is applied over the geo-composite strips 22 and 24, and over the anchors 12 but the free ends 16 of the anchors remaining exposed. Schematically, the membrane 28 is shown as being clear in order to visualize the underlying anchors and geo-composite strips. As mentioned, the spray-on membrane 28 may be a material such as Tamseal 800 which is a high-strength yet flexible and elastomeric polyurethane material having the capability to withstand compression, shear, and torsional forces. A thickness of the spray-on membrane may be, for example, approximately 0.2 inches to 2 inches thick per application with two or three applications. For example, a first application of the spray-on membrane is applied and allowed to sufficiently dry prior to executing a next application of the spray on membrane. A plurality of spray-on applications are executed to generate a spray-on membrane layer of desired overall thickness. The specified thickness of the spray-on membrane will vary depending upon the specific design requirements for the facility. As mentioned, particular attention is paid to applying the spray-on membrane such that there are no gaps around the anchors which may otherwise compromise the liquid proof capability of the membrane. The exposed ends of the anchors may be covered prior to spraying so that in the event threaded anchors are used, the membrane material is not embedded within the threads.

Figure 6:
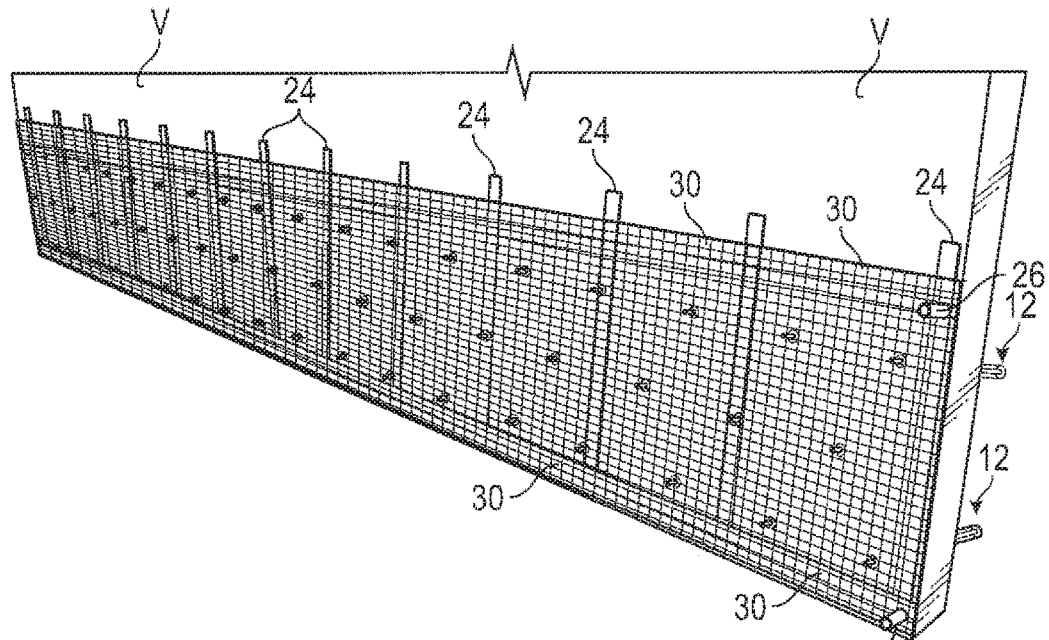
FIG. 6 is another schematic showing a subsequent step in the method of installing the liner system, namely, installation of mesh reinforcement.

Referring to FIG. 6, another step in the method of installing the liner system is shown which includes the installation of mesh reinforcement 30 over the membrane 28. The mesh reinforcement 30 is preferably high strength galvanized steel which ensures a long service life and which provides corrosion protection against leachate leakage or groundwater leakage through a compromised membrane. The mesh reinforcement is spaced from the membrane and preferably is not in contact with the membrane.

Figure 7:
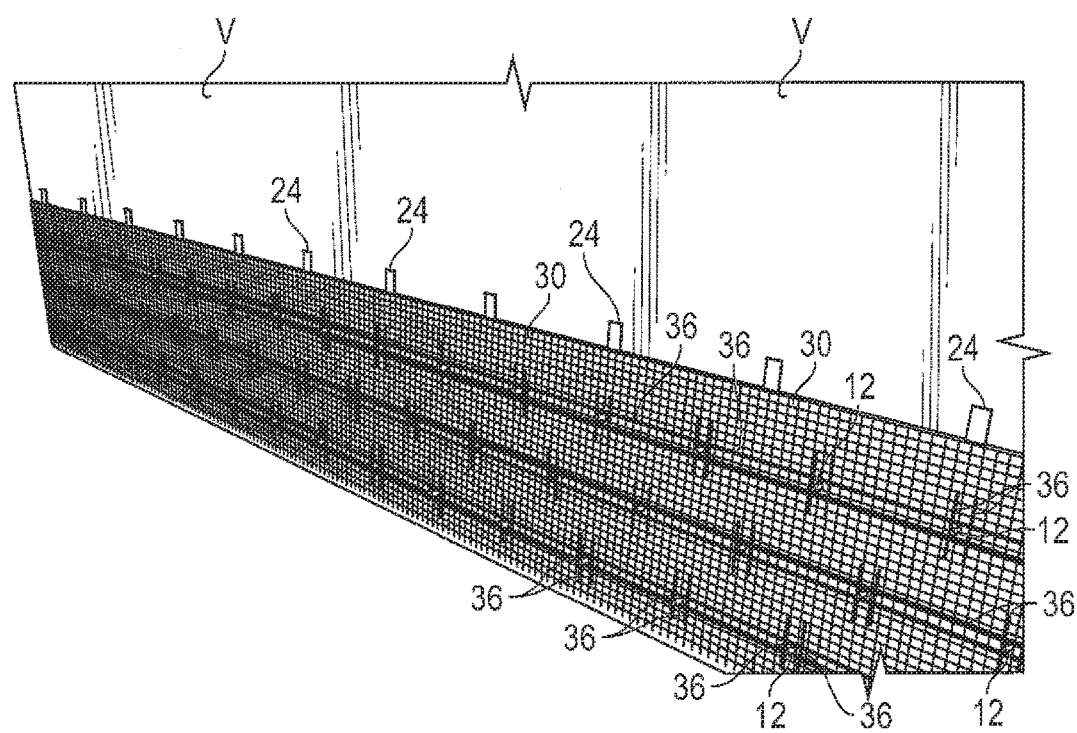
FIG. 7 is another schematic showing a subsequent step in the method of installing the liner system, namely, installation of whalers secured to the underlying mesh reinforcement.
Figure 8:
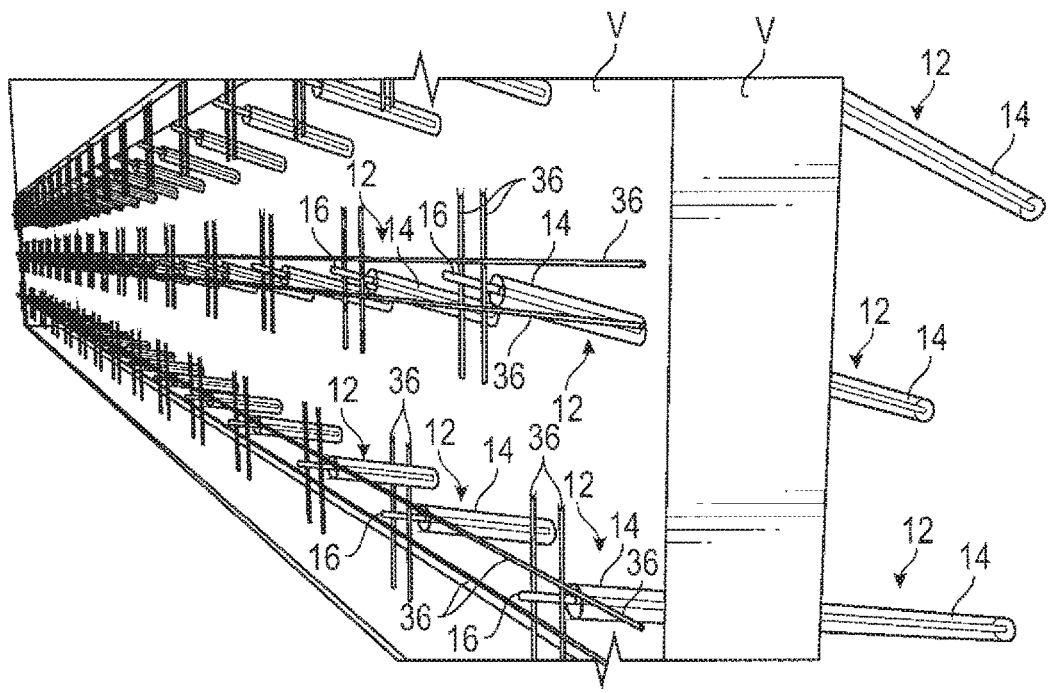
FIG. 8 is a greatly enlarged schematic of a portion of FIG. 7 showing the installed whalers but the mesh reinforced removed to better view the orientation of the whaler members.

Referring to FIGS. 7 and 8, yet another step in the method of installing the liner system is shown in which optional additional steel reinforcement may be provided in the form of whalers 36 that are installed over and in connection with the underlying mesh reinforcement. For clarity, FIG. 7 does not show the underlying membrane 28 or mesh reinforcement 30 to better visualize the arrangement of the whaler members. The whalers 36 may comprise a plurality of horizontal and vertical members or sections of steel material such as rebar. The particular pattern of the whalers 36 in this figure show a crisscross arrangement of whalers centered over the exposed ends 16 of the anchors 12. Accordingly, a closed box is formed around each of the exposed ends 16 of the anchors. FIG. 8 shows both the mesh reinforcement 30 as well as the whalers 36 installed.

Figure 9:
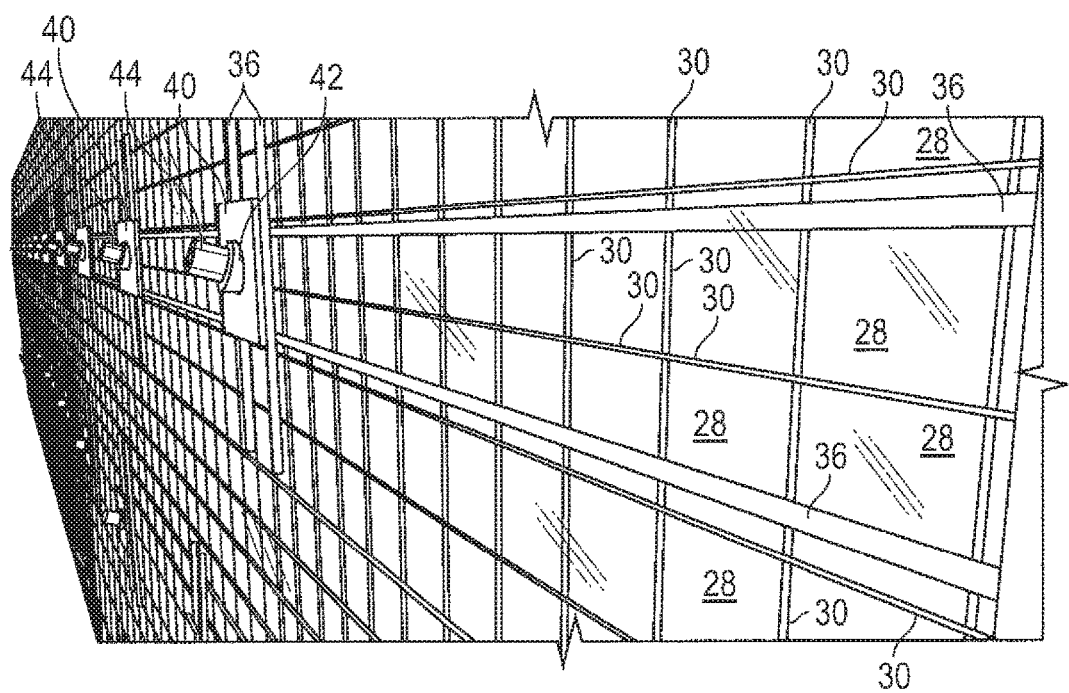
FIG. 9 is another schematic showing a subsequent step in the method of installing the liner system, namely, installation of bearing plates against the mesh reinforcement and hardware to secure the bearing plates and to assist in securing the whalers.

Referring to FIG. 9 a next step in the method of installing the liner system is shown in which the bearing plates 40 and hardware are used to secure the mesh reinforcement and whalers to the anchors 12. As shown, the bearing plates have a central opening through which the exposed ends of the anchors protrude. The hardware may include an angled washer 42 and a nut 44 to secure the bearing plate over a corresponding anchor.

Figure 10:
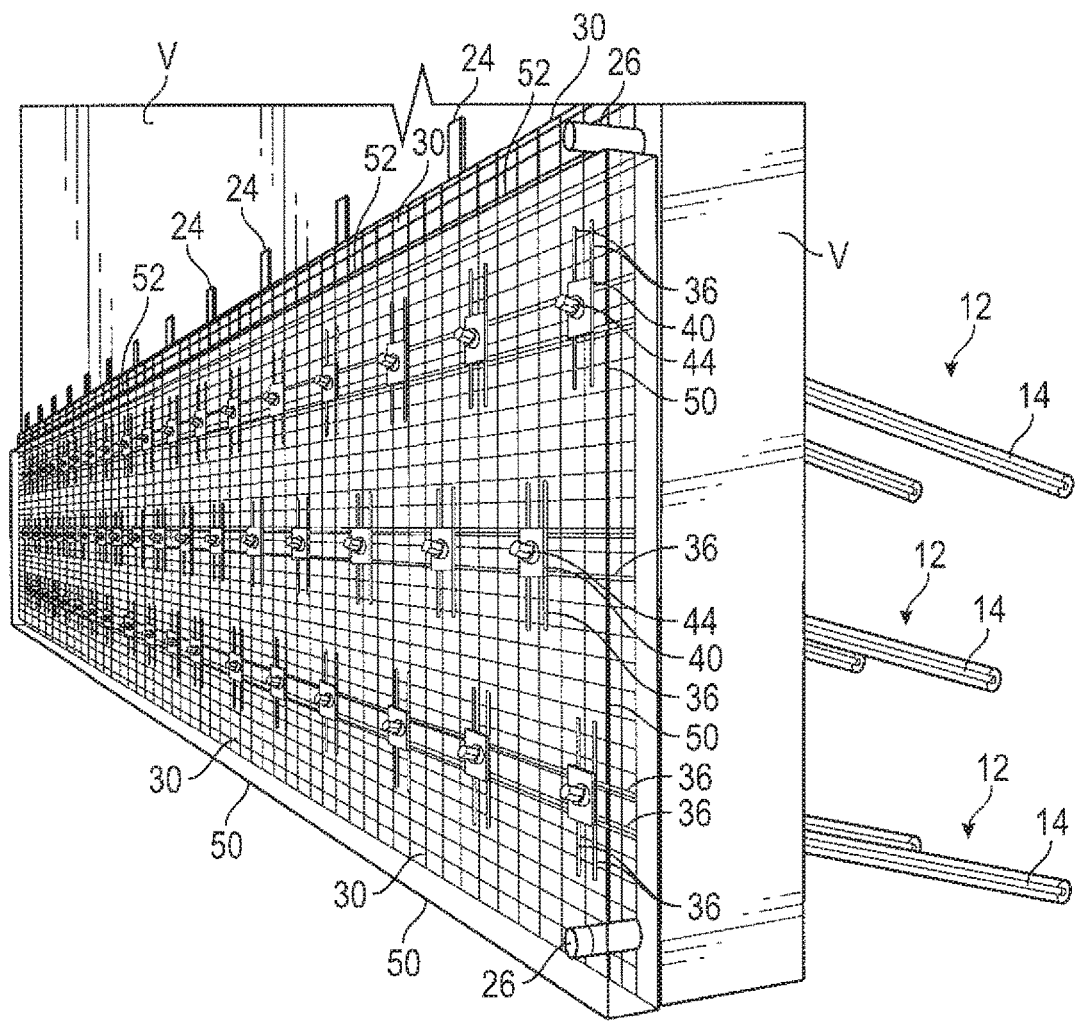
FIG. 10 is another schematic showing a subsequent step in the method of installing the liner system, namely, installation of a concrete protective cap over the metallic or steel reinforcement.

A final step in the method of installing the liner system is shown in FIG. 10 in which the concrete layer 50 is applied. As with the spray-on membrane, the concrete layer 50 is shown as being clear or transparent so that the underlying layers/elements can still be seen. The concrete may be pneumatically applied by a high pressure concrete spray nozzle. The concrete may be a composition such as shotcrete or others. An average thickness for the final concrete layer or cap 50 may be approximately 8-10 inches thick however a more general range for the cap 50 could include a range of between about 1-10 inches. The overall thickness of the liner system of the invention is approximately 1 foot thick which is substantially thinner than a traditional CCL that may be up to 10 feet thick.

It should be noted that the concrete layer 50 has an upper edge 52 that terminates below the upper edges of the mesh reinforcement 30 and sprayed-on barrier membrane 28. The concrete 50 also terminates below the most upper portions or ends of a plurality of the vertical drain strips 24. The portions of the mesh reinforcement 30 and sprayed on membrane 28 that extend above the upper edge 52 of the concrete layer 50 are used to connect or splice with the mesh reinforcement and membrane to be installed for the next band of the liner system. For the mesh reinforcement to be connected between bands, the mesh can be tied to one another with additional tie wires and/or wires from mesh reinforcement bands can be twisted to connect the bands. The next or subsequent membrane to be added can be sprayed such that it overlaps the existing membrane to maintain a water proof and sealed connection between the membranes between bands. Accordingly, liner system bands can be tied and sealed to one another to form an integrated and continuous liner system in incremental construction.

Figure 11:
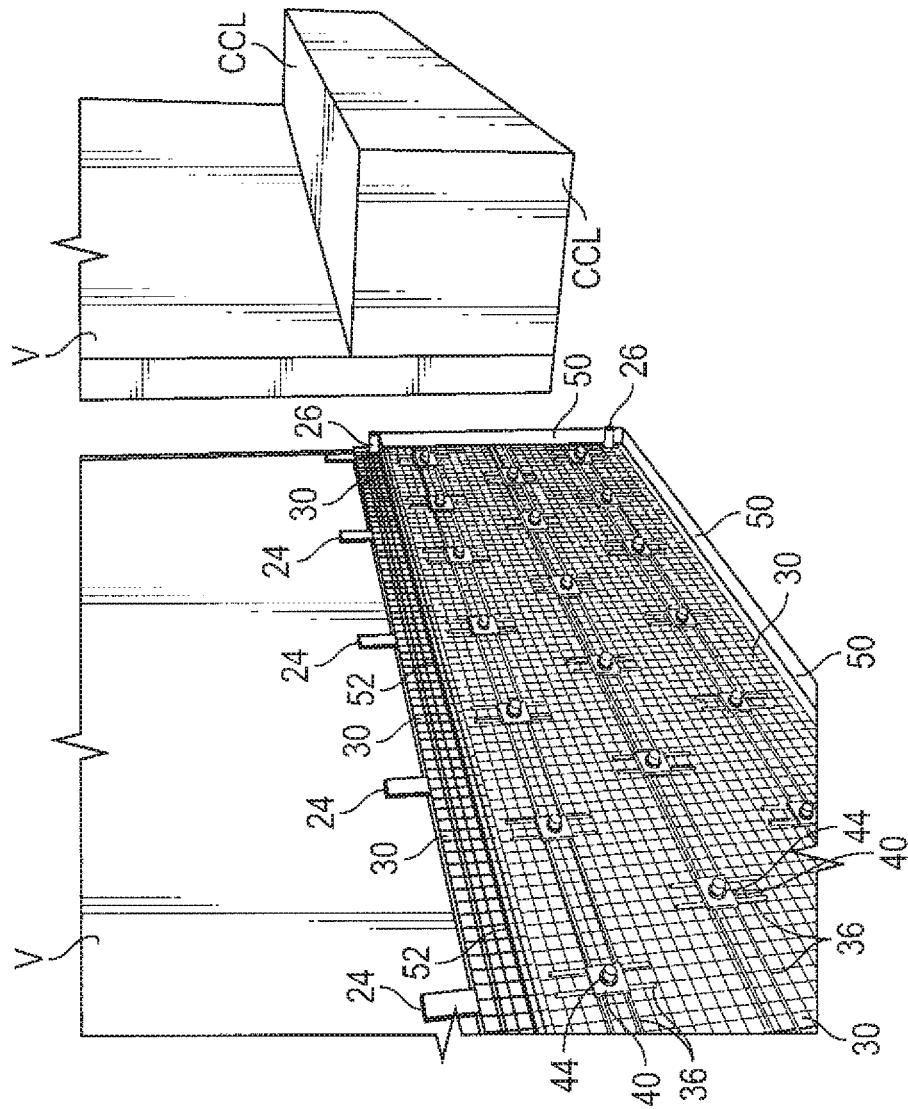
FIG. 11 is another schematic showing a comparison of the liner system of the invention as compared to a CCL that is typically specified at 10 feet thick for a vertical wall of a MWF.

FIG. 11 shows a prior art CCL for comparison purposes. It should be apparent in this figure of the significant differences in the thicknesses of the two liner systems. In addition to the concrete layer 50 saving significant costs because less concrete can be used, this outer structural layer provides excellent protection for the underlying spray-on membrane.

Figure 12:
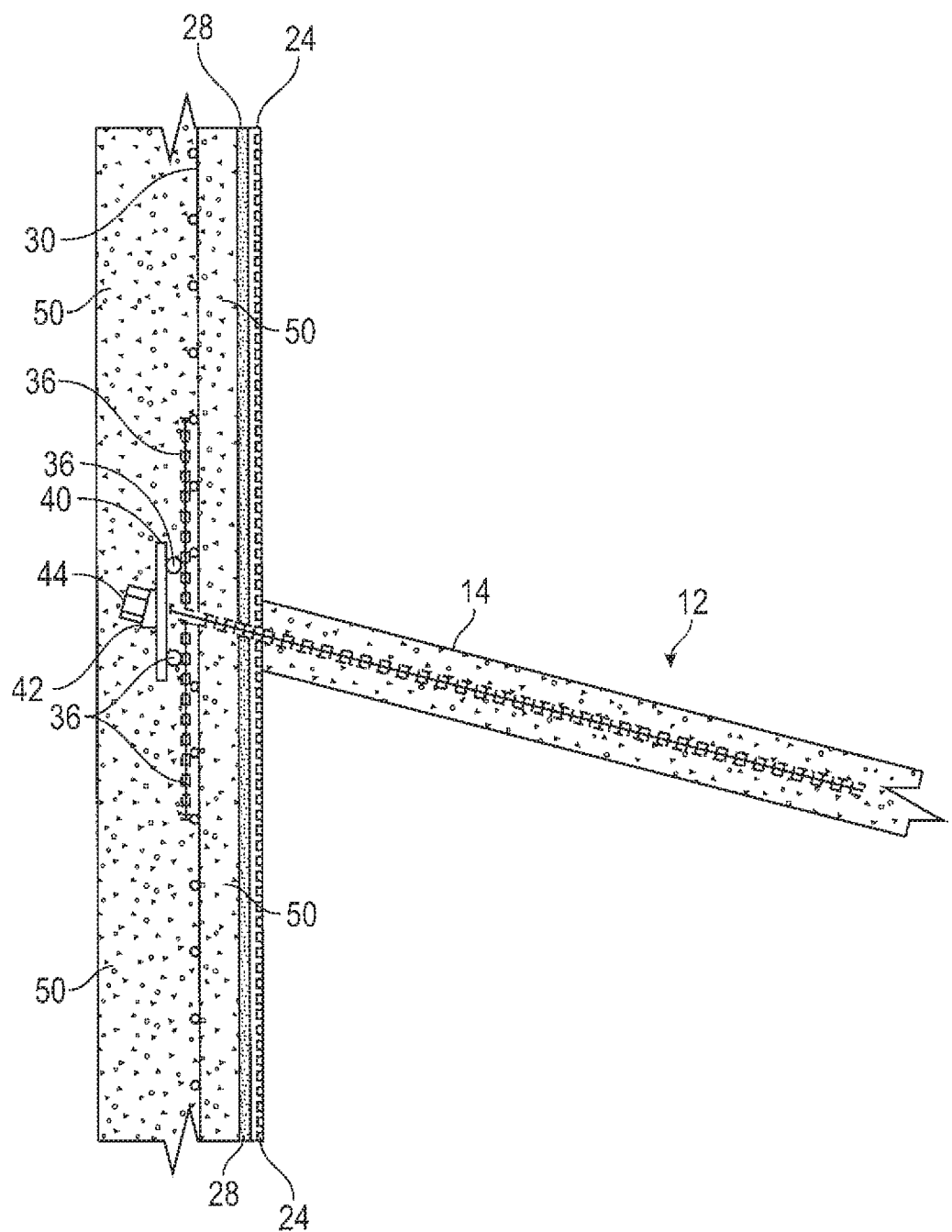
FIG. 12 is a vertical cross section of the liner system in an embodiment.

FIG. 12 shows a cross sectional view of the liner system of the invention. This figure emphasizes the structurally robust yet compact design in which the steel reinforcement and anchors allow the concrete cap or protective layer 50 to be minimized in thickness. The anchors 12 provide significant pull-out strength to ensure the steel reinforcement 30 remains in place. As shown, the concrete 50 is applied so that it covers the steel reinforcement, bearing plates 40, and hardware, and also fills in gaps between the membrane 28 and the mesh reinforcement layer 30. The concrete cap 50 prevents draw down forces from being transferred to the membrane 28. Each component of the liner system can be installed without the need for heavy equipment to emplace much larger and heavier components such as pre fabricated concrete panels in the prior art. The liner system of the invention can be constructed incrementally as time passes and in response to the operations of the facility so that capital outlay for the liner system can be spread out over a longer period of time without compromising the quality of the installed liner system. Splicing adjacent bands of the liner system is achieved without significant equipment or manpower requirements which further validate the liner system as a cost effective solution.

Figure 13:
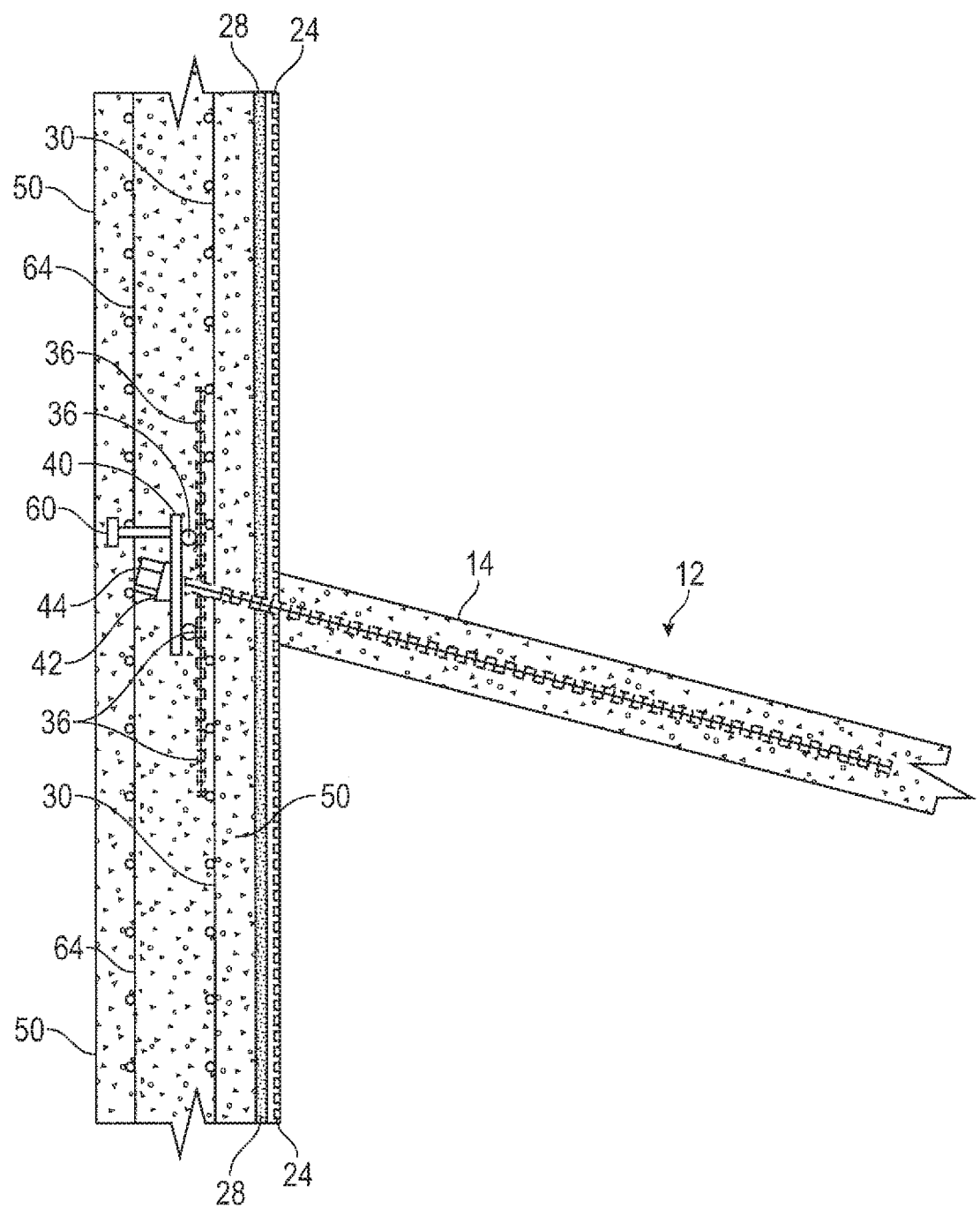
FIG. 13 is another vertical cross section of the liner system in another embodiment that adds shear studs and a second mesh reinforcement layer for additional steel or metallic reinforcement.

FIG. 13 shows the liner system of FIG. 12 in cross section but further adds additional steel reinforcement, namely, shear studs 60 that are welded to and protrude from the bearing plates 40 and a second mesh reinforcement layer 64 that can be tied or otherwise secured to the shear studs 60. As shown, the second mesh layer 64 is spaced from the first mesh layer 30 and the concrete 50 also fills the gaps between the mesh reinforcement layers. One or a plurality of the shear studs 60 may be added to each bearing plate 40 to provide the necessary anchoring capability for the second mesh layer 64. The shear studs 60 and second mesh layer 64 provide yet additional strength for the liner system and particularly assist in concrete reinforcement to withstand shear forces directed downward against the liner system, such as the drawn down forces associated with waste decomposition.

In lieu of a spray-on membrane, the system and method of the invention may include the use of a pre-fabricated membrane that is positioned on the surfaces of the walls. One example of commercially available pre-fabricated membranes includes Sikaplan® membranes. These membranes are provided in sheet sizes that can be cut to fit the area to be waterproofed. Seams or edges between adjacent sheets of the waterproof membrane may be sealed to one another by heat welding. Again because of the incremental way in which the liner system of the invention can be installed, material costs for this alternate liner system are minimized because the amount of liner material required is only enough necessary to line the next lift or band of the liner system.

The invention is set forth herein with respect to a system and method. The corresponding preferred embodiments, although described in particular detail herein, may be modified or changed commensurate with the scope of the claims appended hereto. Therefore, the preferred embodiments as described should not be deemed as limiting the scope of the invention but shall be interpreted only as complying with the disclosure requirements.

What is claimed is:

1. A liner system especially adapted for installation on near vertical or vertical walls of a waste facility, said liner system comprising:
   (1) a first liner assembly band including:
      a. a first plurality of anchors imbedded in a wall of the waste facility, each anchor having an exposed end that protrudes from the wall;
      b. a first plurality of drain elements that capture water and channel the water away from the liner system;
      c. a first water proof membrane applied to the wall to function as a waterproof layer to prevent liquid from escaping the liner system;
      d. a first metallic reinforcement including a first mesh reinforcement layer placed adjacent the first water proof membrane and supported by said first anchors and a first plurality of whalers connected to the first mesh reinforcement layer; and
      e. a first layer of concrete applied to function as a protective cap layer for the first liner assembly band; the applied first layer of concrete providing a structural connection for the first anchors, first drain elements, first water proof membrane and first metallic reinforcement,
         wherein the first liner assembly has an upper end defined by an upper edge of said layer of concrete, said waterproof membrane and said metallic reinforcement extending above said upper end as splicing elements;
   (2) a second liner assembly band disposed above said first liner assembly band including:
      a. a second plurality of anchors imbedded in the wall of the waste facility, each anchor having an exposed end that protrudes from the wall;
      b. a second plurality of drain elements that capture water and channel the water away from the liner system;
      c. a second water proof membrane applied to the wall to function as a waterproof layer to prevent liquid from escaping the liner system;
      d. a second metallic reinforcement including a second mesh reinforcement layer placed adjacent the second water proof membrane and supported by said second anchors, and a second plurality of whalers connected to the second mesh reinforcement layer, said second mesh reinforcement layer having a lower end spliced to said splicing elements of said first metallic reinforcement;
      e. a second layer of concrete applied to function as a protective cap layer for the second liner assembly band; the applied second layer of concrete providing a structural connection for the second anchors, second drain elements, second water proof membrane and second metallic reinforcement; and
      f. wherein the second water proof membrane is applied by spraying so that it overlaps the waterproof membrane of the first liner assembly band thereby creating a continuous waterproof membrane between the first and second liner assembly bands.

2. A liner system, as claimed in claim 1, further including:
   an first additional mesh reinforcement layer spaced from the first mesh reinforcement layer, and said first layer of concrete being applied to also cover said additional mesh reinforcement layer.

3. The liner system, as claimed in claim 1, further including: a second additional mesh reinforcement layer spaced from the second mesh reinforcement layer, and said second layer of concrete being applied to also cover said second additional mesh reinforcement layer.

4. The liner system, as claimed in claim 1, further including:
   a plurality of shear studs attached to corresponding bearing plates to provide additional metallic reinforcement for either or both of said first and second liner assembly bands.

5. The liner system, according to claim 1, wherein:
   the first or second water proof membrane is a spray-on membrane.

6. The liner system, according to claim 1, wherein:
   the first or second water proof membrane is a prefabricated membrane material sized to cover the wall.

* * * * *